Feb. 17, 1970         M. KEIM         3,495,496
RING MEMBER ADAPTED TO BE PLACED AROUND A SHANK
AT A MIDPOINT THEREOF
Filed Nov. 14, 1967
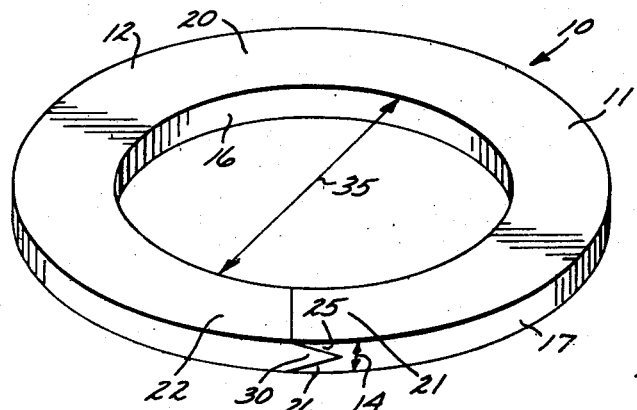
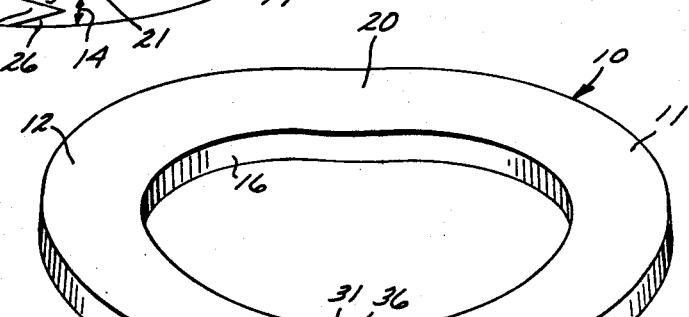
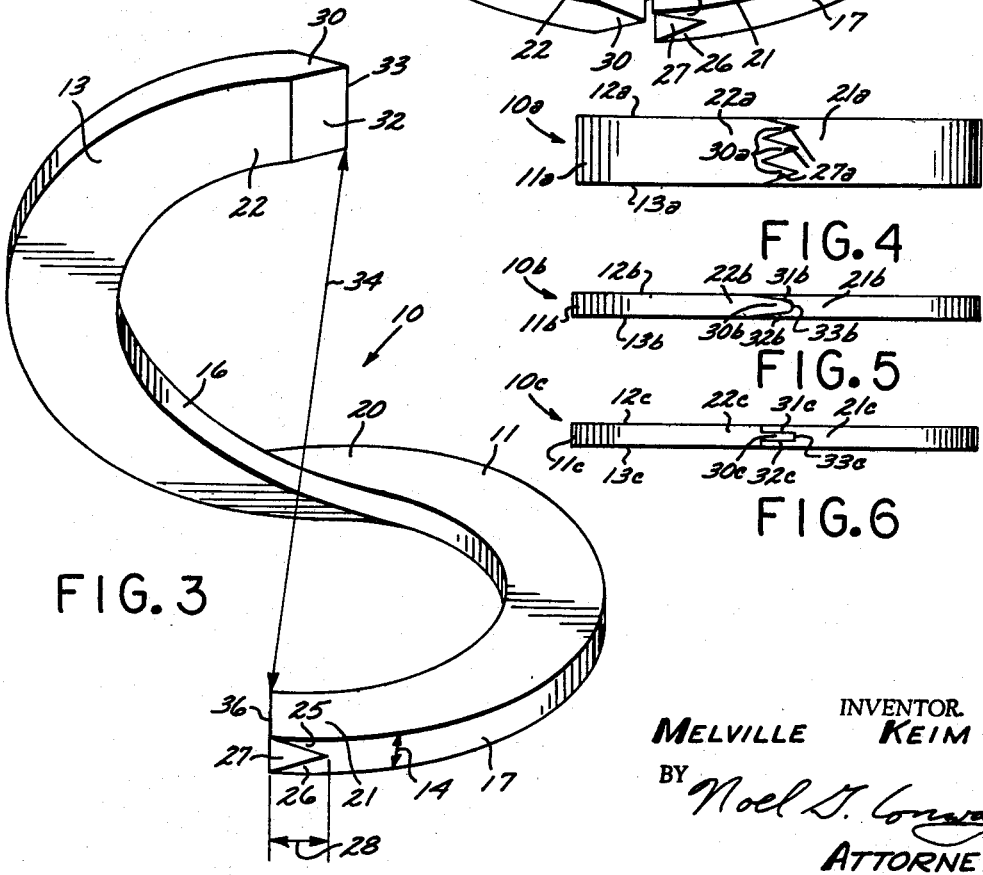
INVENTOR.
MELVILLE KEIM
BY Noel T. Conway
ATTORNEY

United States Patent Office 3,495,496
Patented Feb. 17, 1970

3,495,496
RING MEMBER ADAPTED TO BE PLACED AROUND A SHANK AT A MIDPOINT THEREOF
Melville Keim, 933 Via Lido Soud, Newport Beach, Calif. 92660
Filed Nov. 14, 1967, Ser. No. 682,900
Int. Cl. F16b 43/00
U.S. Cl. 85—51                                10 Claims

ABSTRACT OF THE DISCLOSURE

This invention relates to ring members, and more particularly to such ring members that can be placed in operative position around a shank at a midportion of the shank.

---

A ring having a non-continuous, ring-shaped, planar body with first and second end portions joined by a center portion and having on said first end portion two wall sections defining therebetween a recess which extends parallel to the plane of the ring across the end of said end portion, and the second end portion has a male section normally received in said recess when the end portions are in a first position, and said center portion has sufficient flexibility that a person may move the end portions apart from said first position to a second position where the male section is out of said recess and sufficient flexibility that a person may move the first and second end portions in opposite directions normal to said ring washer plane a distance at least equal to the diameter of the hole through the center of the washer.

Embodiments of the present invention are particularly useful in situations where a washer must be placed on a shank at a midpoint thereof, and the washer must resist extra well forces tending to deform the washer out of its normal plane. It should be understood throughout this specification and the appended claims that the term "shank" is merely used as a generic term to indicate some type of member around which the washer is placed, and the member might be a bar or even a rope.

Briefly, washers, or rings, of the present invention include a flexible, normally planar, ring-shaped body which has been cut through at one side in a particular manner in order to form on one side of the cut a male section which cooperates with a female portion on the other side of the cut. The washer has sufficient flexibility that a person can move the male section out of operative engagement with the female portion and then the washer body can be twisted in order to permit the washer to be encircled around a shank. At that time, the washer is returned to its normal planar relation and the male section is indexed into the female portion. At such time, the normal resiliency of the washer body will maintain the male section in the female portion in order to restrain movement of the washer body in that area in a direction normal to the plane of the washer. As will be described, the resiliency of the washer body tends to lock the male section into the female portion.

With the foregoing in mind, it is a major object of this invention to provide an improved ring which can be placed around a shank at a midpoint thereon.

Another object of this invention is to provide a low cost washer which is adapted to be easily placed upon a shank.

A further object of this invention is to provide a washer bearing having a ring-shaped body with a cut in one side of the body with improved means for increasing the integrity of the washer bearing when in the normal position.

It is still another object of this invention to provide a washer bearing having a normally planar ring-shaped body with a cut through one side of the ring and locking means at the area of the cut to prevent relative movement of the ring body immediately adjacent either side of the cut in a direction normal to the plane of the body.

It is a still further object of this invention to provide a washer having a ring-shaped body with a cut through one side thereof and improved locking structure at the area of the cut to lock together the two sides of the cut.

It is still another object of this invention to provide an improved washer having a ring-shaped body which is cut through one side thereof and provided with a male section on one side of the cut and a female portion on the other side of the cut with sufficient resiliency of the body that the male section is urged into the female portion and sufficient flexibility that a person can move the male section and the female portion apart sufficiently to disengage them for purposes of installation of the washer around a shank.

Other and further objects of this invention will become apparent in the detailed description below in conjunction with the attached drawings wherein:

FIGURE 1 is a perspective view of a first embodiment of the present invention shown in its normal planar condition;

FIGURE 2 discloses the washer of FIGURE 1 with the male section and female portion being pulled apart slightly so as to disengage them;

FIGURE 3 discloses the washer of FIGURE 1 and FIGURE 2 after the washer has been twisted sufficiently in order to encircle it around a shank;

FIGURE 4 is a side view of a second embodiment of the present invention wherein the locking means includes a plurality of male sections received into a plurality of female recesses;

FIGURE 5 is a third embodiment of the present invention wherein the male section and female portions are shaped somewhat differently than in the first embodiment; and FIGURE 6 is a fourth embodiment of the present invention disclosing another form of locking means which can be used on the washer.

Referring now to FIGURES 1, 2 and 3 the first embodiment of the present invention will be described in detail. In these figures, a ring, or washer, indicated generally by arrow 10, includes a ring-shaped body 11 which is preferably made out of a material such as plastic or resilient metal. Normally, the washer body 11 defines a plane with the first and second faces 12 and 13 respectively facing in opposite directions from each other. The second face 13 is spaced from the first face 12 by the thickness of the washer body, indicated by dimension line 14.

As can be seen, an inner wall 16 joins the inner edges of the faces 12 and 13 while outer wall 17 joins the outer edges of these respective faces. The outer wall 17 is radially spaced outward from the inner wall 16 a predetermined distance which is the width of the body 11.

The continuity of the body 11 has been interrupted at one side for a purpose to be described. Therefore, the body 11 includes a center portion 20 with a first end portion 21 on one side and a second end portion 22 on the other side of the center portion. The first end portion 21 is provided with a pair of wall sections 25 and 26 which extend parallel to the plane of the washer body 11 and provide a V-shape cross section recess 27 therebetween extending parallel to the plane of the washer body across the end of the first end portion. The depth of the recess 27 is preferably substantially deeper than the thickness of the washer body 11 as demonstrated by a comparison of dimension line 28 and the dimension line 14.

On the second end section 22, there is provided a male section 30 which also extends parallel to the plane of the washer body and has two surfaces 31 and 32 which respectively taper from the first and second faces 12 and 13 to form a wedge having a V-shape cross section which will fill the V-shape cross section of the recess 27 when the washer is in the condition shown in FIGURE 1.

While it is preferred that the depth of the recess 27 be considerably greater than the thickness at the base of the male section 30 (in order to maintain a desirable minimal angle of convergence between the two surfaces 31 and 32) the washer will work rather satisfactorily so long as the recess 27 is at least as deep as the male section is thick at its base.

The washer body 11 is constructed such that the first and second end portions 21 and 22 will normally be urged to a first position as shown in FIGURE 1 wherein the male section 30 fills the recess 27. However, the washer body 11 has sufficient flexibility, that a person can move the first and second end portions 21 and 22 apart to a second position such as shown in FIGURE 2 where free end 33 of the male section 30 is out of the recess 27. At that point, because of the flexibility of the body 11 (particularly at the center portion 20), the first end portion 21 can be moved in one direction normal to the plane of the washer body while the second end portion 22 is moved in the opposite direction. The flexibility of the washer is such that the first end portion 21 and the second portion 22 can be moved apart a distance, indicated by dimension line 34, which is at least equal to the diameter of the hole enclosed by the inner wall 16, which diameter is indicated by dimension line 35. Therefore, the washer body 11 can be passed around a shank while in the condition shown in FIGURE 3. Then, the person will relax the pressure and allow the normal resiliency of the washer to return the washer body 11 toward the planar condition. When the first end portion 21 and the second end portion 22 are again juxtarelated to each other, it is necessary for the person to pull them apart slightly in order to allow the free end 33 to clear free end 36 of the wall section 25. Once the free end 33 of the male section 30 is between the wall sections 25 and 26, the person can merely release the washer body and the resiliency of the body will force the male section into the recess 27.

In FIGURE 4 there is disclosed a second embodiment of the present invention. This embodiment is similar to the first and therefore the different portions will be designated by the same numerals with a suffix of an *a*. In FIGURE 4, there is disclosed a washer, indicated generally by the arrow 10*a*, which is of a thicker design. This washer 10*a* has a washer body 11*a* which is the same as the washer body 11 in all portions which cannot be seen in FIGURE 4. Therefore, these other portions are not shown. The washer body 11*a* has been cut and has a first end portion 21*a* and a second end portion 22*a* which are directly comparable with the first and second end portions 21 and 22 on the washer body 11. However, it will be noted that, in this case, the first end portion 21*a* has four wall sections which provide therebetween three recesses 27*a* each having a V-shape cross section. When the washer body 11*a* is in the normal position, three male sections 30*a* on the second end portion 22*a* are received in the respective recesses 27*a*.

This embodiment of the present invention is useful with washers having a thick body in order to keep low the angle of convergence of the surfaces (comparable to the surfaces 31 and 32) of the male sections 30*a* and yet not require a very long section. If only a single male section and female recess were used, the male section would be so long that it would be very difficult to move the first and second end portions 21*a* and 22*a* apart sufficiently to have the free end of the male section clear the free end of the wall sections forming the recess. While no recess 27*a* is as deep as the thickness of the washer body 11*a*, for purposes of analysis of the angle of convergence of the two surfaces of the male sections 30*a* (and that is the important element) one should compare the length of the male section with the portion of the thickness of the washer body at the base of the male sections 30*a*. In the case of the washer body 11*a*, the three male sections 30*a* divide the thickness of the washer body into three equal parts. And, the length of the male sections 30*a* are each individually substantially greater than ⅓ of the thickness of the body 11*a*.

Referring now to FIGURE 5, there is disclosed another embodiment of the present invention. In this figure, there is disclosed a washer 10*b*. As all parts of the washer 10*b* are directly comparable to the washer 10, the different parts have been designated by the same numerals as in the case of the washer 10 but with a suffix *b*. In this case, washer body 10*b* has a first and second face 12*b* and 13*b* extending parallel to the plane of the washer. Second end portion 22*b* has a male section 30*b* which is somewhat different that in the first embodiment. In this case, it can be seen that the male section 30*b* has first surface 31*b* and second surface 32*b* tapering toward each other at a very small angle from said first and second faces 12*b* and 13*b*. In this case, the surfaces 31*b* and 32*b* are joined by a curved section at free end 33*b*. The female recess on the first end portion 21*b* is shaped so that the male section 30*b* will completely fill the recess when the male section is in the position shown. With this device, it can be seen that the angle of convergence of the two surfaces 31*b* and 32*b* can be very small, and yet, the length of the male section 30*b* is not unduly long.

In FIGURE 6, there is disclosed another embodiment of the present invention. In this embodiment there is disclosed a washer, indicated generally by the arrow 10*c*. As the various components are directly comparable to components of the first embodiment, the corresponding components are given the same numeral designation with the suffix *c*. The washer 10*c* has a washer body 11*c* with first and second faces 12*c* and 13*c* respectively extending parallel to the plane of the washer. In this case, male section 30*c* is provided with surfaces 31*c* and 32*c* each of which extend parallel to the plane of the washer for a short distance before they are joined at free end 33*c*. As can be seen, the surfaces 31*c* and 32*c* do not converge. Rather, each of them are spaced toward each other respectively from the faces 12*c* and 13*c* so as to provide a male section 30*c* with a rectangular cross section. There is provided on the first end portion 21*c* a recess also having a rectangular cross section for the purpose of receiving the male section 30*c*.

The use of the washers 10*a*, 10*b*, and 10*c* is substantially the same as the first embodiment of the invention. More particularly, the individual pulls the respective first and second end portions apart to a second position where the male sections (30*a*, 30*b*, and 30*c*) are out of the respective recesses which are formed on the respective first end portions (21*a*, 21*b*, and 21*c*). Then, the washer body is twisted like shown in FIGURE 3 in order to be placed around a shank, and the body is returned to its normal position in the same manner described in conjunction with the first embodiment of the present invention.

The washer bodies 11*a*, 11*b*, and 11*c* can be made of the same material as the first embodiment, e.g., plastic or resilient metal.

While only a few embodiments of the present invention have been shown and described in letail, it will be apparent to those skilled in the art that such is by way of illustration only and numerous changes can be made thereto without departing from the spirit of the present invention. For example, although the present invention speaks of the washer bodies being cut at one side, it is to be understood that the respective male sections and recesses can be formed by other methods, e.g., molding.

I claim:

1. A ring member adapted to be placed around a shank at a midpoint thereon, said member comprising:
a generally flat circular body defining a plane, said body having a predetermined thickness in a direction normal to said plane, said body including:
- a first face extending parallel to said plane and facing normal to said plane in a first direction;
- a second face spaced from said first face, the thickness of said body and facing in the opposite direction of said first face;
- said first and second faces each having an inner and an outer edge;
- an inner wall joining said first and second faces at said respective inner edges and defining a hole of predetermined diameter through the center of said body;
- an outer wall joining said first and second faces at said respective outer edges of said faces, said outer wall being radially spaced from said inner wall a predetermined distance which is the width of the body, said width being greater than said thickness an less than said hole diameter;
- a center portion and a first end portion and a second end portion on opposite sides of said center portion;
- a female portion on said first end portion having two wall sections defining a recess therebetween which extends across the end of said end portion at least part way from said inner wall to said outer wall;
- a male section on the end of said second end portion substantially filling said recess when said first and second end portions are in a first position and restraining said end portions against movement in opposite directions normal to said plane when said end portions are in said first position;
- at least the center portion of said body having sufficient flexibility to permit a person to move said first and second end portions in the plane of said body away from each other from said first position to a second position where said male section is out of said recess, said body having sufficient flexibility to permit a person to move said first and second end portions away from each other normal to the plane of the member a distance equal to the diameter of the hole;
- said body having sufficient resiliency to normally return said first and second end portions to said first position when the pressure of person is removed.

2. The ring member set forth in claim 1 wherein said two wall sections on said second end portion form a recess having a V cross section.

3. The ring member set forth in claim 1 wherein: said second end portion has thereon a plurality of adjacent wall portions extending across the end of said second end portion forming a plurality of recesses extending parallel to the plane of the ring member; and said first end portion has thereon a plurality of adjacent wall portions extending across the end of the first end portion forming a plurality of male sections extending parallel to the plane of the ring member received in said plurality of recesses when said first and second end portions are in said first position.

4. The invention set forth in claim 1 wherein said male section has a pair of opposed surfaces which taper from said first and second faces toward each other at a small angle to said plane for a predetermined distance to a point where said surfaces are joined by a curved section at a free end of said male section;
and said recess of said female portion engages all parts of said male section.

5. The invention set forth in claim 1 wherein said two wall sections of said female portion each extend parallel to said first and second faces of said body a predetermined distance and are joined by a joinder wall section;
and said male section substantially fills said recess when said first and second end portions are in said first position.

6. The invention set forth in claim 1, wherein:
said recess has a depth at least equal to the thickness of the body.

7. The invention set forth in claim 2 wherein: said recess has a depth at least equal to the thickness of the body.

8. The invention set forth in claim 3 wherein: said recesses have a depth at least equal to the thickness of the body.

9. The invention set forth in claim 4 wherein: said recess has a depth at least equal to the thickness of the body.

10. The invention set forth in claim 5 wherein: said recess has a depth at least equal to the thickness of the body.

References Cited
UNITED STATES PATENTS

| | | | |
|---|---|---|---|
| 1,327,417 | 1/1920 | Barton | 85—51 |
| 1,409,320 | 3/1922 | Voss | 24—256 |
| 1,425,182 | 5/1922 | Dubbs | 85—51 |
| 2,629,908 | 3/1953 | Keck | 85—8.8 |
| 3,317,966 | 5/1967 | Gildone | 24—27 |
| 2,133,752 | 10/1938 | Myer et al. | |

EDWARD C. ALLEN, Primary Examiner